US012411351B2

(12) United States Patent
Golubchik et al.

(10) Patent No.: US 12,411,351 B2
(45) Date of Patent: Sep. 9, 2025

(54) MULTIPLE COHERENT BEAM COMBINATION SYSTEMS WITH REDUCED NUMBER OF APERTURES

(71) Applicant: RAFAEL ADVANCED DEFENSE SYSTEMS LTD., Haifa (IL)

(72) Inventors: Daniel Golubchik, Kiryat Bialik (IL); David Shwa, Kfar Tavor (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 401 days.

(21) Appl. No.: 18/024,988

(22) PCT Filed: Aug. 5, 2021

(86) PCT No.: PCT/IB2021/057199
§ 371 (c)(1),
(2) Date: Mar. 7, 2023

(87) PCT Pub. No.: WO2022/049429
PCT Pub. Date: Mar. 10, 2022

(65) Prior Publication Data
US 2023/0296908 A1    Sep. 21, 2023

(30) Foreign Application Priority Data
Sep. 7, 2020 (IL) .......................................... 277191

(51) Int. Cl.
*G02B 27/14* (2006.01)
*G01S 7/481* (2006.01)
(Continued)

(52) U.S. Cl.
CPC .......... *G02B 27/141* (2013.01); *G01S 7/4815* (2013.01); *G01S 7/4816* (2013.01);
(Continued)

(58) Field of Classification Search
None
See application file for complete search history.

(56) References Cited

U.S. PATENT DOCUMENTS

| 4,102,572 A | 7/1978 | O'Meara |
| 7,999,922 B1 | 8/2011 | Cochrane et al. |

(Continued)

FOREIGN PATENT DOCUMENTS

| CN | 111435161 A | 7/2020 |
| CN | 110729628 A | 5/2021 |

(Continued)

OTHER PUBLICATIONS

Supplementary European Search Report for EP21863780 Mailed on Feb. 12, 2024.

(Continued)

*Primary Examiner* — Robert E. Tallman
(74) *Attorney, Agent, or Firm* — Rivka Friedman

(57) ABSTRACT

A first transceiver has a beam emitter that generates first coherent beams, and first optics that direct the first coherent beams towards a target and collect radiation reflected from the target. A second transceiver has a beam emitter that generates second coherent beams, a detector, and second optics having an aperture. The second optics directs the second coherent beams towards the target via the aperture, collects radiation reflected from the target via the aperture, and guides a first radiation component of the collected radiation, that corresponds to the first coherent beams, to the detector. The detector generates, from the first radiation component, a signal indicative of an intensity of radiation impinging on the target corresponding to the first coherent beams. A control subsystem is associated with the transceivers and modifies at least one parameter of the first transceiver based on the intensity signal.

16 Claims, 5 Drawing Sheets

(51) Int. Cl.
*G01S 7/497* (2006.01)
*G01S 17/86* (2020.01)
*G02B 23/04* (2006.01)
*G02B 26/08* (2006.01)
*G02B 27/00* (2006.01)
*G02B 27/10* (2006.01)

(52) U.S. Cl.
CPC .............. *G01S 7/497* (2013.01); *G01S 17/86* (2020.01); *G02B 23/04* (2013.01); *G02B 26/0833* (2013.01); *G02B 27/0068* (2013.01); *G02B 27/1013* (2013.01)

(56) References Cited

U.S. PATENT DOCUMENTS

| | | | |
|---|---|---|---|
| 8,076,624 B1 | 12/2011 | Barchers | |
| 8,575,528 B1 | 11/2013 | Barchers | |
| 2005/0135815 A1* | 6/2005 | Gerwe | H01S 3/2383 398/188 |
| 2007/0086010 A1* | 4/2007 | Rothenberg | H01S 3/1301 356/450 |
| 2008/0042042 A1 | 2/2008 | King et al. | |
| 2009/0185176 A1* | 7/2009 | Livingston | H01S 3/1305 356/237.2 |
| 2011/0176565 A1 | 7/2011 | Hutchin | |
| 2012/0292481 A1* | 11/2012 | Hutchin | G01S 17/89 250/214 R |
| 2014/0023161 A1 | 1/2014 | Navid et al. | |
| 2014/0231618 A1* | 8/2014 | Beresnev | G02B 27/0087 250/201.9 |
| 2021/0294109 A1* | 9/2021 | Golubchik | G01S 7/497 |

FOREIGN PATENT DOCUMENTS

| | | |
|---|---|---|
| JP | 2005529496 A | 9/2005 |
| JP | 2011254028 A | 12/2011 |
| WO | 2020016824 A1 | 1/2020 |

OTHER PUBLICATIONS

Israeli Search Report for IL277191 Mailed on Jan. 6, 2022.
Japanese Search Report for JP2023-515081 Mailed on Mar. 4, 2024.
Japanese Office Action for JP2023-515081 Mailed on Oct. 9, 2024.
International Search Report.
International Written Opinion.

* cited by examiner

MULTIPLE COHERENT BEAM COMBINATION SYSTEMS WITH REDUCED NUMBER OF APERTURES

Multiple Coherent Beam Combination Systems with Reduced Number of Apertures

TECHNICAL FIELD

The present invention relates to Coherent Beam Combination (CBC) systems.

BACKGROUND OF THE INVENTION

The effective range of high-power laser systems is limited by several factors, including effects of atmospheric turbulence. Approaches to mitigating turbulence effects have been proposed, including approaches that use a deformable mirror in combination with a wavefront sensor to perform target image correction, and approaches which employ CBC systems in which a plurality of coherent laser beams are combined to form output beams in order to achieve power scaling of a laser source. However, these approaches are typically limited to low-turbulence conditions and cooperative targets, respectively. Combinations of these two approaches have also been proposed, allowing for turbulence correction (image correction and CBC output beam optimization) under low-turbulence conditions with non-cooperative targets.

In addition, such combined approaches typically rely on deploying two optical telescopes of comparable size, in which one telescope is used for transmitting high-power beams by the CBC system, and the other telescope is used to collect reflected radiation from the target to perform image correction (using the deformable mirror and the wavefront sensor) and CBC output beam optimization.

SUMMARY OF THE INVENTION

The present invention is a system and method for transmitting radiation to a target and receiving radiation reflected from the target via a shared optical aperture of a transceiver.

According to the teachings of an embodiment of the present invention, there is provided a system comprising: a first transceiver comprising: a first beam emitting subsystem configured to generate a first plurality of coherent beams, a first detector to receive radiation, and a first optical assembly having an aperture and configured to: direct the first plurality of coherent beams through the aperture towards a target, collect, via the aperture, radiation reflected from the target, the collected reflected radiation including at least a first component of radiation corresponding to the first plurality of coherent beams and a second component of radiation corresponding to a second plurality of coherent beams impinging on the target, and guide the second component of radiation to the first detector, the first detector configured to generate, from the second component of radiation, a signal indicative of an intensity of radiation impinging on the target corresponding to the second plurality of coherent beams; a second transceiver comprising: a second beam emitting subsystem configured to generate the second plurality of coherent beams, a second detector to receive radiation, and a second optical assembly having an aperture and configured to: direct the second plurality of coherent beams through the aperture of the second optical assembly towards the target, collect, via the aperture of the second optical assembly, radiation reflected from the target, the reflected radiation collected by the second optical assembly including at least a first component of radiation corresponding the first plurality of coherent beams and a second component of radiation corresponding to the second plurality of coherent beams, and guide the first component of the reflected radiation collected by the second optical assembly to the second detector, the second detector configured to generate, from the first component of the reflected radiation collected by the second optical assembly, a signal indicative of an intensity of radiation impinging on the target corresponding to the first plurality of coherent beams; and a control subsystem associated with the first transceiver and the second transceiver, the control subsystem configured to: modify at least one parameter of the first transceiver based on the signal generated by the second detector, and modify at least one parameter of the second transceiver based on the signal generated by the first detector.

According to a further feature of an embodiment of the present invention, the control subsystem modifies the at least one parameter of the first transceiver by actuating the first beam emitting subsystem to adjust a beam parameter of one or more coherent beams of the first plurality of coherent beams based on the signal generated by the second detector, and the control subsystem modifies the at least one parameter of the second transceiver by actuating the second beam emitting subsystem to adjust a beam parameter of one or more coherent beams of the second plurality of coherent beams based on the signal generated by the first detector.

According to a further feature of an embodiment of the present invention, the first optical assembly includes a first telescope arrangement for directing the first plurality of coherent beams towards the target and for collecting the reflected radiation from the target, and the second optical assembly includes a second telescope arrangement for directing the second plurality of coherent beams towards the target and for collecting the reflected radiation from the target.

According to a further feature of an embodiment of the present invention, the first telescope arrangement has an aperture that defines the aperture of the first optical assembly, and the first telescope arrangement directs the first plurality of coherent beams towards the target and collects the reflected radiation from the target through the aperture of the first telescope arrangement, and the second telescope arrangement has an aperture that defines the aperture of the second optical assembly, and the second telescope arrangement directs the second plurality of coherent beams towards the target and collects the reflected radiation from the target through the aperture of the second telescope arrangement.

According to a further feature of an embodiment of the present invention, the first optical assembly further includes a first selective optical element configured to: transmit or reflect radiation emitted by the first beam emitting subsystem to the first telescope arrangement, and reflect or transmit incident received from the first telescope arrangement towards the first detector, and the second optical assembly further includes a second selective optical element configured to: transmit or reflect radiation emitted by the second beam emitting subsystem to the second telescope arrangement, and reflect or transmit incident received from the second telescope arrangement towards the second detector.

According to a further feature of an embodiment of the present invention, the first optical assembly further includes a first adaptive optical element deployed between the first selective optical element and the first detector in an optical path from the first telescope arrangement to the first detector, the first adaptive optical element configured to: receive radiation from the first selective optical element, and direct the received radiation to the first detector, and the second optical assembly further includes a second adaptive optical element deployed between the second selective optical element and the second detector in an optical path from the second telescope arrangement to the second detector, the second adaptive optical element configured to: receive radiation from the second selective optical element, and direct the received radiation to the second detector.

According to a further feature of an embodiment of the present invention, the first adaptive optical element includes a deformable reflective surface, and the second adaptive optical element includes a deformable reflective surface, and the control subsystem modifies the at least one parameter of the first transceiver by selectively deforming the reflective surface of the first adaptive optical element based on the signal generated by the second detector, and the control subsystem modifies the at least one parameter of the second transceiver by selectively deforming the reflective surface of the second adaptive optical element based on the signal generated by the first detector.

According to a further feature of an embodiment of the present invention, the first optical assembly defines a first optical path and a second optical path, and the first plurality of coherent beams propagate from the first beam emitting subsystem to the aperture of the first optical assembly along the first optical path, and the second component of radiation propagates from the aperture of the first optical assembly to the first detector along the second optical path, and the second optical assembly defines a first optical path and a second optical path, and the second plurality of coherent beams propagate from the second beam emitting subsystem to the aperture of the second optical assembly along the first optical path of the second optical assembly, and the first component of the reflected radiation collected by the second optical assembly propagates from the aperture of the second optical assembly to the second detector along the second optical path of the second optical assembly.

According to a further feature of an embodiment of the present invention, the radiation from the first plurality of coherent beams is centered around a first wavelength, and the radiation from the second plurality of coherent beams is centered around a second wavelength different from the first wavelength.

There is also provided according to the teachings of an embodiment of the present invention, a system comprising: a first transceiver comprising: a first beam emitting subsystem configured to generate a first plurality of coherent beams at a first wavelength, a first detector to receive radiation, and a first optical assembly including: a first telescope arrangement having an aperture and configured to: direct the first plurality of coherent beams through the aperture towards the target, and collect, via the aperture, radiation reflected from the target, the reflected radiation collected by the telescope arrangement includes at least radiation at the first wavelength corresponding to the first plurality of coherent beams and radiation at a second wavelength corresponding to a second plurality of coherent beams impinging on the target, and a first dichroic mirror configured to: transmit or reflect incident radiation at the first wavelength emitted by the first beam emitting subsystem to the first telescope arrangement, and reflect or transmit incident radiation at the second wavelength, collected by the first telescope arrangement, towards the first detector, the first detector is configured to generate, from the radiation at the second wavelength collected by the first telescope arrangement, a signal indicative of an intensity of radiation impinging on the target corresponding to the second plurality of coherent beams; a second transceiver comprising: a second beam emitting subsystem configured to generate the second plurality of coherent beams at a first wavelength, a second detector to receive radiation, and a second optical assembly including: a second telescope arrangement having an aperture and configured to: direct the second plurality of coherent beams through the aperture of the second telescope arrangement towards the target, and collect, via the aperture of the second telescope arrangement, radiation reflected from the target, the reflected radiation collected by the second telescope arrangement including at least radiation at the first wavelength corresponding to the first plurality of coherent beams and radiation at the second wavelength corresponding to the second plurality of coherent beams impinging on the target, and a second dichroic mirror configured to: transmit or reflect incident radiation at the second wavelength emitted by the second beam emitting subsystem to the second telescope arrangement, and reflect or transmit incident radiation at the first wavelength, collected by the second telescope arrangement, towards the second detector, the second detector is configured to generate, from the radiation at the first wavelength collected by the second telescope arrangement, a signal indicative of an intensity of radiation impinging on the target corresponding to the first plurality of coherent beams; and a control subsystem associated with the first transceiver and the second transceiver, the control subsystem configured to: modify at least one parameter of the first transceiver based on the signal generated by the second detector, and modify at least one parameter of the second transceiver based on the signal generated by the first detector.

According to a further feature of an embodiment of the present invention, the control subsystem modifies the at least one parameter of the first transceiver by actuating the first beam emitting subsystem to adjust a beam parameter of one or more coherent beams of the first plurality of coherent beams based on the signal generated by the second detector, and the control subsystem modifies the at least one parameter of the second transceiver by actuating the second beam emitting subsystem to adjust a beam parameter of one or more coherent beams of the second plurality of coherent beams based on the signal generated by the first detector.

According to a further feature of an embodiment of the present invention, the first optical assembly further includes a first deformable mirror having a deformable reflective surface and configured to: receive, from the first dichroic mirror, the reflected or transmitted incident radiation at the second wavelength, and direct the received radiation to the first detector, and the second optical assembly further includes a second deformable mirror having a deformable reflective surface and configured to: receive, from the second dichroic mirror, the reflected or transmitted incident radiation at the first wavelength, and direct the received radiation to the second detector.

According to a further feature of an embodiment of the present invention, the control subsystem modifies the at least one parameter of the first transceiver by selectively deforming the reflective surface of the first deformable mirror based on the signal generated by the second detector, and the control subsystem modifies the at least one parameter of the second transceiver by selectively deforming the reflective surface of the second deformable mirror based on the signal generated by the first detector.

There is also provided according to the teachings of an embodiment of the present invention, a system comprising: a set of transceivers including at least a first transceiver and a second transceiver, each of the transceivers in the set of transceivers including: a detector, a beam emitting subsystem configured to generate a plurality of coherent beams, the plurality of coherent beams generated by the beam emitting subsystem of the first transceiver at a first wavelength and the plurality of coherent beams generated by the beam emitting subsystem of the second transceiver are at a second wavelength different from the first wavelength, and an optical assembly including: a dichroic mirror, and a telescope arrangement having an aperture and configured to: direct the plurality of coherent beams through the aperture towards a target common to all of the transceivers in the set of transceivers, and collect, via the aperture, radiation reflected from the target; and a control subsystem associated with the transceivers, the dichroic mirror of the first transceiver configured to transmit or reflect radiation at the first wavelength, emitted by the beam emitting subsystem of the first transceiver, to the telescope arrangement of the first transceiver, and is configured to reflect or transmit radiation at the second wavelength, collected by the telescope arrangement of the first transceiver, towards the detector of the first transceiver, and the detector of the first transceiver configured to generate, from the radiation reflected or transmitted by the dichroic mirror of the first transceiver, a signal indicative of an intensity of radiation impinging on the target corresponding to the plurality of coherent beams generated by the beam emitting subsystem of the second transceiver, and the dichroic mirror of the second transceiver configured to transmit or reflect radiation at the second wavelength, emitted by the beam emitting subsystem of the second transceiver, to the telescope arrangement of the second transceiver, and is configured to reflect or transmit radiation at a wavelength that is different from the second wavelength, collected by the telescope arrangement of the second transceiver, towards the detector of the second transceiver, and the detector of the second transceiver configured to generate, from the radiation reflected or transmitted by the dichroic mirror of the second transceiver, a signal indicative of an intensity of radiation impinging on the target corresponding to a plurality of coherent beams directed towards the target by a transceiver of the set of transceivers that is different from the first transceiver, and the control subsystem configured to: modify at least one parameter of the second transceiver based on the signal generated by the detector of the first transceiver, and modify at least one parameter of the transceiver of the set of transceivers that is different from the first transceiver based on the signal generated by the detector of the second transceiver.

According to a further feature of an embodiment of the present invention, the control subsystem modifies the at least one parameter of the second transceiver by actuating the beam emitting subsystem of the second transceiver to adjust a beam parameter of one or more of the coherent beams generated by the beam emitting subsystem of the second transceiver based on the signal generated by the detector of the first transceiver, and the control subsystem modifies the at least one parameter of the transceiver of the set of transceivers that is different from the first transceiver by actuating the beam emitting subsystem of the transceiver of the set of transceivers that is different from the first transceiver to adjust a beam parameter of one or more of the coherent beams generated by the beam emitting subsystem of the set of transceivers that is different from the first transceiver based on the signal generated by the detector of the second transceiver.

According to a further feature of an embodiment of the present invention, each beam emitting subsystem includes an array of beam sources and a plurality of adjustable phase modulators associated with the array of beam sources, and the actuating the beam emitting subsystem includes actuating each of the phase modulators of the beam emitting subsystem to modulate a current phase of a corresponding one of the coherent beams generated by the beam emitting subsystem between at least three phase states.

According to a further feature of an embodiment of the present invention, the optical assembly of each of the transceivers further includes: a deformable mirror having a deformable reflective surface and deployed between the dichroic mirror and the detector in an optical path from the telescope arrangement to the detector, the deformable mirror configured to receive the reflected or transmitted radiation by the dichroic mirror and direct the received radiation to the detector.

According to a further feature of an embodiment of the present invention, the control subsystem modifies the at least one parameter of the second transceiver by selectively deforming the deformable reflective surface of the deformable mirror of the first transceiver based on the signal generated by the detector of the second transceiver, and the control subsystem modifies the at least one parameter of the transceiver of the set of transceivers that is different from the first transceiver by selectively deforming the deformable reflective surface of the deformable mirror of the transceiver of the set of transceivers that is different from the first transceiver based on the signal generated by the detector of the first transceiver.

According to a further feature of an embodiment of the present invention, the set of transceivers includes exactly two transceivers.

According to a further feature of an embodiment of the present invention, the transceiver of the set of transceivers that is different from the first transceiver is the second transceiver.

There is also provided according to the teachings of an embodiment of the present invention, a method comprising: generating a first plurality of coherent beams and a second plurality of coherent beams; transmitting or reflecting, by a selective optical element, the first plurality of coherent beams towards a telescope; directing, through an aperture of the telescope, the first plurality coherent beams towards a target; collecting, through the aperture of the telescope, radiation reflected from the target, the reflected radiation collected by the telescope including at least a first component of radiation corresponding the first plurality of coherent beams and a second component of radiation corresponding to the second plurality of coherent beams impinging on the target; reflecting or transmitting, by the selective optical element, the second component of radiation towards a detector; generating by the detector from the second component of radiation collected by the telescope, a signal indicative of an intensity of radiation impinging on the target corresponding to the second plurality of coherent beams; and adjusting at least one beam parameter of one or more of the coherent beams of the second plurality of coherent beams based on the generated signal.

According to a further feature of an embodiment of the present invention, there is also provided transmitting or reflecting, by a second selective optical element, the second plurality of coherent beams towards a second telescope; directing, through an aperture of a second telescope, the second plurality coherent beams towards the target; collecting, through the aperture of the second telescope, radiation reflected from the target, the reflected radiation collected by the second telescope including at least a first component of radiation corresponding the first plurality of coherent beams and a second component of radiation corresponding to the second plurality of coherent beams impinging on the target; reflecting or transmitting, by the second selective optical element, the first component of radiation collected by the second telescope towards a second detector; generating by the second detector from the first component of radiation collected by the second telescope, a signal indicative of an intensity of radiation impinging on the target corresponding to the first plurality of coherent beams; and adjusting at least one beam parameter of one or more of the coherent beams of the first plurality of coherent beams based on the generated signal.

According to a further feature of an embodiment of the present invention, there is also provided receiving, by a deformable mirror, the second component of radiation reflected or transmitted by the selective optical element; and directing the received second component of radiation to the detector.

According to a further feature of an embodiment of the present invention, there is also provided selectively deforming a deformable reflective surface of the deformable mirror based on the generated signal.

There is also provided according to the teachings of an embodiment of the present invention, a system comprising: a first transceiver comprising: a first beam emitting subsystem configured to generate a first plurality of coherent beams, and a first optical assembly configured to direct the first plurality of coherent beams towards a target, and collect radiation reflected from the target; a second transceiver comprising: a second beam emitting subsystem configured to generate a second plurality of coherent beams, a detector to receive radiation, and a second optical assembly having an aperture and configured to: direct the second plurality of coherent beams through the aperture towards the target, collect, via the aperture, radiation reflected from the target, the collected reflected radiation including at least a first component of radiation corresponding to the first plurality of coherent beams and a second component of radiation corresponding to the second plurality of coherent beams impinging on the target, and guide the first component of radiation to the detector, the detector is configured to generate, from the first component of radiation, a signal indicative of an intensity of radiation impinging on the target corresponding to the first plurality of coherent beams; and a control subsystem associated with the first transceiver and the second transceiver, the control subsystem configured to modify at least one parameter of the first transceiver based on the signal generated by the detector of the first transceiver.

According to a further feature of an embodiment of the present invention, the control subsystem modifies the at least one parameter of the first transceiver by actuating the first beam emitting subsystem to adjust a beam parameter of one or more coherent beams of the first plurality of coherent beams based on the signal generated by the detector.

According to a further feature of an embodiment of the present invention, the control subsystem modifies the at least one parameter of the first transceiver by modifying a parameter of the first optical assembly based on the signal generated by the detector.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
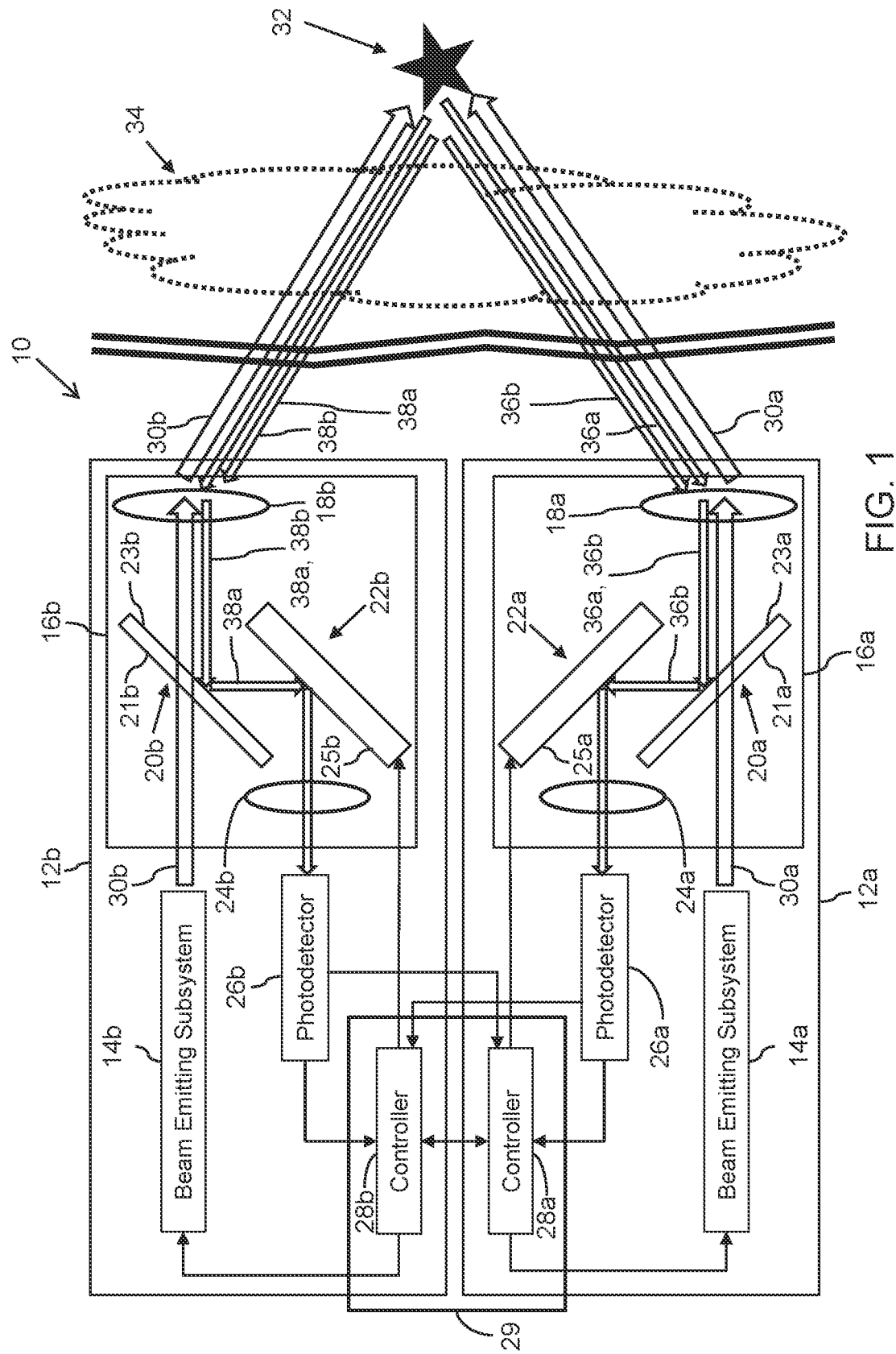
FIG. 1 is a schematic representation of a system having two transceivers, constructed and operative according to embodiments of the present invention, each transceiver for transmitting beams towards a target and receiving radiation reflected from the target through a common aperture.

The present invention is directed to a system and method for transmitting radiation to a target and receiving radiation reflected from the target via a shared optical aperture of a transceiver, and for generating correction signals based on the received reflected radiation and applying those correction signals (or signals/parameters derived therefrom) to radiation transmission and/or receiving components of another transceiver that transmitted the radiation corresponding to the received reflected radiation. In certain embodiments, two such transceivers are deployed, with each of the transceivers having a beam emitting subsystem for emitting beams and an optical assembly (having a dichroic mirror and a telescope) locked onto a single target for directing the emitted beams towards the target. In such embodiments, the beam emitting subsystem of the first transceiver generates a first beam at a first wavelength which is transmitted or reflected by the dichroic mirror to the telescope, which directs the first beam to the target, and the beam emitting subsystem of the second transceiver generates a second beam at a second wavelength which is transmitted or reflected by the dichroic mirror to the telescope, which directs the second beam to the target. The proportion of radiation from the second beam that is reflected from the target is collected by the telescope of the first transceiver and is reflected or transmitted by the dichroic mirror towards a first photodetector, and the proportion of radiation from the first beam that is reflected from the target is collected by the telescope of the second transceiver and is reflected or transmitted by the dichroic mirror towards a second photodetector. A single aperture is used by each telescope for directing the transmitted beam and for collecting reflected radiation, which ensures a common propagation path of the transmitted beam and received radiation through the atmosphere. Each of the optical assemblies also includes an adaptive optical element, preferably in the form of a deformable mirror, which receives the collected radiation from the dichroic mirror and deflects the radiation to the photodetector (optionally via focusing optics) so as to form an image of the target and illumination spot on the photodetector. The photodetectors generate turbulence-correction signals from the received radiation, and a control subsystem linked to the transceivers uses the signals to modify at least one parameter of the each of the transceivers to perform phase correction and image correction. In certain embodiments, the at least one parameter includes a transmission parameter and a receiving parameter. The modification of the transmission parameter is performed by modifying beam parameters of the transmitted beams, and the modification of the receiving parameter is performed by deforming the deformable reflective surfaces of the deformable mirrors.

The principles and operation of the system and method according to present invention may be better understood with reference to the drawings accompanying the description.

The system and method according to the present invention is of particular value when applied within the context of high-energy laser or directed-energy weapons systems.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Referring now to the drawings, FIG. 1 illustrates an implementation of a multiple coherent beam combination (CBC) system (referred to as hereinafter as "the system"), generally designated 10, constructed and operative according to certain non-limiting embodiments of the present disclosure. In general terms, the system 10 includes a set of at least two radiation transceivers for transmitting beams (of radiation) towards a target 32, receiving radiation reflected from the target 32, processing signals derived from the received radiation, and modifying transmission and receiving parameters of the transceivers by controlling components of the transceivers based on those processed signals. Two such transceivers, designated 12a and 12b, are shown by way of example in FIG. 1. In this example, and as will be discussed below, the transceiver 12a is configured to transmit beams towards the target 32 and receive radiation reflected from the target, including components of radiation corresponding to the beams transmitted towards the target 32 by another one of the transceivers (in this case the transceiver 12b), and the transceiver 12b is configured to transmit beams towards the target 32 and receive radiation reflected from the target, including components of radiation corresponding to the beams transmitted towards the target 32 by another one of the transceivers (in this case the transceiver 12a).

It is noted that although only two transceivers are illustrated here, the embodiments of the present disclosure may be implemented with a set (or battery) of transceivers that contains more than two such transceivers. However, as will be discussed in subsequent sections of the present disclosure, limitations of the optical components of the transceivers make the system ideally suitable for two transceivers, and in certain cases three such transceivers, and preferably no more than four such transceivers. It is generally noted that the structure and operation of each of the transceivers in the set of transceivers is generally similar to the structure and operation of the other transceivers in the set, with the differences between the transceivers being self-evident in view of the subsequent description. Although the structure and operation of only two transceivers 12a and 12b is provided in detail in the present disclosure, the structure and operation of additional transceivers in the set of transceivers should generally be understood by analogy thereto.

Bearing the above in mind, the transceivers 12a and 12b respectively include beam emitting subsystems 14a and 14b configured to generate respective output beams 30a and 30b for directing towards an area of the target 32. The beams 30a and 30b are transmitted along an optical path passing through an optically non-uniform and/or transiently varying medium 34, such as the atmosphere, towards the target 32. Each of the output beams 30a and 30b is formed from a plurality of respective coherent beam sources (sub-beams) by the respective beam emitting subsystem. Preferably, beam emitting subsystems 14a and 14b (also referred to as "beam generating arrangements" or "beam emitters") are configured to generate/emit the output beams 30a and 30b at two different respective wavelengths, i.e., the light of the output beam 30a is preferably centered around a first particular wavelength Aa and the light of the output beam 30b is preferably centered around a second particular wavelength Ab that is different from the first wavelength Aa. The two center wavelengths Aa and Ab preferably occupy the same region of the electromagnetic spectrum, and more preferably occupy the near-infrared (NIR) region of the electromagnetic spectrum. It is also preferable that the two center wavelengths Aa and Ab are selected so that they are measurably different wavelengths, but are also relatively close to each other within the same region of the electromagnetic spectrum.

Figure 2:
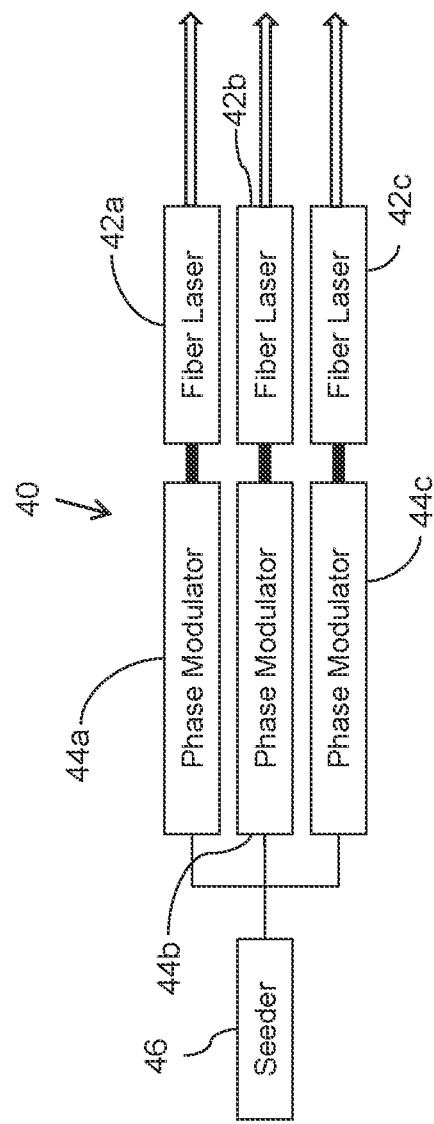
FIG. 2 is a schematic representation of a beam emitting subsystem that can be implemented in the transceivers for transmitting the beams, according to embodiments of the present invention.

FIG. 2 schematically illustrates a non-limiting example of a beam emitting subsystem 40 which can be used to implement the beam emitting subsystems 14a and 14b. Generally speaking, the beam emitting subsystem 40 includes an array of beam sources 42a, 42b and 42c configured to generate a plurality of coherent beams (also referred to as "sub-beams") for directing towards the target 32. A plurality of adjustable phase modulators 44a, 44b and 44c are associated with respective beam sources 42a, 42b and 42c to allow adjustment of relative phase offsets of the beams. Although only three beam sources and phase modulators are illustrated in FIG. 2 for simplicity of presentation, the embodiments of the present disclosure are most preferably implemented with an array containing anywhere between two and a few hundred beams, and is most typically implemented with at least 10 beam sources, and in some particularly preferred cases, in the range of 15-40 beam sources. The phase modulators are typically provided one-per-source, although it will be appreciated that one of the sources may be implemented as a fixed reference phase without adjustment, and the rest of the beams and phase offsets may be measured and/or adjusted relative to that reference phase.

It will be understood that various details of the implementations of the system 10 and the beam emitting subsystem 40 will vary considerably according to the intended application of the device. The variety of applications may extend from a low-energy research tool for measuring high-speed variations in optical properties of turbulent media through various communications applications (medium energy) up to high-energy directed-energy weapon systems. Although the beam emitting subsystem 40, and by extension the system 10, supports a wide variety of applications, the beam emitting subsystem 40 and the system 10 are of particular value when used as part of a high-energy laser or directed-energy weapons system. In each case, the array of beam sources 42a, 42b and 42c is most preferably an array of fiber lasers, seeded by a common seeder oscillator 46. For high energy applications, each fiber laser is preferably rated for a power output of at least 1 kW. The principles of the present embodiments may be used for devices operating with various different wavelengths, but is typically implemented in the near-infrared (NIR) range. Seeder oscillators and fiber lasers suitable for operating in these ranges are well known in the art, and are readily commercially available. The phase modulators 44a, 44b and 44c may be any type of phase modulator with suitable response times and low attenuation. The phase modulators are positioned after splitting the seeder 46, but preferably before the fiber amplifiers in order to operate with a relatively low-power signal. Suitable phase modulators are available commercially. One suitable non-limiting example is a 10 GHz titanium indiffused Z-Cut LiNbO3 phase modulator identified by model no. LN53S-FC commercially available from Thorlabs, NJ (USA).

Collimating optics (not shown) are preferably associated with each of the fiber lasers 42a, 42b and 42c so as to collimate the sub-beams emitting by the beam emitting subsystem 40.

Although the sub-beams for each of the particular output beams 30a and 30b are coherent so as to constructively interfere, the output beams 30a and 30b themselves are preferably mutually incoherent. In other words, whereas the sub-beams of a particular output beam have the same effective wavelength and phase, the output beams 30a and 30b have different respective effective wavelength and/or phase (as alluded to above when discussing the center wavelengths Aa and Ab of the output beams 30a and 30b, respectively).

It is noted that the number of sub-beams generated by the beam emitting subsystems need not necessarily be uniform across the beam emitting subsystems. In other words, each of the output beams 30a and 30b may be composed of a different respective number of sub-beams. For example, one of the beam emitting subsystems may generate on the order of 10 sub-beams (i.e., may include on the order of 10 beam sources), while another of the beam emitting subsystems may generate between 15-40 sub-beams.

Returning to FIG. 1, an optical assembly 16a of the transceiver 12a is associated with the beam emitting subsystem 14a, directs the output beam 30a towards the area of the target 32, collects radiation reflected from the target 32, and guides a portion of the collected radiation to a photodetector 26a (referred to interchangeably as "detector 26a"). The optical assembly 16a has a single effective aperture, whereby the output beam 30a is directed to the target through the single effective aperture, and the reflected radiation is collected by the optical assembly 16a via the single effective aperture. An optical assembly 16b of the transceiver 12b is associated with the beam emitting subsystem 14b, directs the output beam 30b towards the area of the target 32, collects radiation reflected from the target 32, and guides a portion of the collected radiation to a photodetector 26b (referred to interchangeably as "detector 26b"). The optical assembly 16b also has a single effective aperture, whereby the output beam 30b is directed to the target through the single effective aperture, and the reflected radiation is collected by the optical assembly 16b via the single effective aperture.

Each of the optical assemblies 16a and 16b supports the dual function of beam director, for directing the respective output beams 30a and 30b to the target 32, and detection and imaging, for guiding radiation reflected from the target to respective photodetectors 26a and 26b so as to allow the detection/measurement of the radiation and the formation images of the target 32 and the area of the target illuminated by the respective beams 30b and 30b. This dual functionality, coupled with the use of a common aperture for both beam direction and detection/imaging, enables the system 10 to perform beam intensity optimization and image correction in high turbulence conditions without the use of wavefront sensors, as will be discussed in subsequent sections of the present disclosure. In addition, the optical assemblies 16a and 16b each have a transmission channel for transmitting radiation at one wavelength and a receiving channel for receiving radiation at a different wavelength. In embodiments limited to two transceivers, it is preferable that propagation of radiation of a first wavelength is supported by the transmission channel of the first optical assembly and the receiving channel of the second optical assembly, and propagation of radiation of a second wavelength is supported by the receiving channel of the first optical assembly and the transmission channel of the second optical assembly.

Generally speaking, when the output beams 30a and 30b impinge on the target 32, a proportion of the intensity of the radiation from each of the output beams 30a and 30b is reflected from the target 32 as a corresponding respective reflected radiation component. The total radiation reflected from the target includes multiple components of radiation, including at least one component corresponding to the reflection by the beam 30a and another component corresponding to the reflection by the beam 30b. The radiation collected by the optical assemblies 16a and 16b includes both of these components of radiation (which may be at different intensities when received at the collecting optics of the optical assemblies 16a and 16b), and each of the optical assemblies 16a and 16b includes optical components operative to guide selected components of the collected radiation to the photodetectors 26a and 26b. In FIG. 1, the reflected radiation component corresponding to the reflection by the beam 30a as received by the optical assembly 16a is designated 36a, and the reflected radiation component corresponding to the reflection by the beam 30b as received by the optical assembly 16a is designated 36b. The reflected radiation component corresponding to the reflection by the beam 30a as received by the optical assembly 16b is designated 38a, and the reflected radiation component corresponding to the reflection by the beam 30b as received by the optical assembly 16b is designated 38b Turning now to the structural details of the optical assemblies 16a and 16b in more detail, the optical assemblies 16a and 16b respectively include optical arrangements 18a and 18b, selective optical elements 20a and 20b, adaptive optical elements 22a and 22b, and focusing optics 24a and 24b. The optical assembly 16a defines two optical paths, namely a first optical path supporting the transmission channel from the beam emitting subsystem 14a to the telescope 18a, and a second optical path supporting the receiving channel from the telescope 18a to the detector 26a. Radiation from the beam emitting subsystem 14a (i.e., the output beam 30a) is guided along the first optical path (via the transmission channel), and selected components of radiation reflected from the target 32 and received by the telescope 18a are guided along the second optical path (via the receiving channel). Similarly, the optical assembly 16b defines two optical paths, namely a first optical path supporting the transmission channel from the beam emitting subsystem 14b to the telescope 18b, and a second optical path supporting the receiving channel from the telescope 18b to the detector 26b. Radiation from the beam emitting subsystem 14b (i.e., the output beam 30b) is guided along the first optical path (via the transmission channel), and selected components of radiation reflected from the target 32 and received by the telescope 18b are guided along the second optical path (via the receiving channel).

In order to ensure that the photodetectors 26a and 26b receive the correct radiation, and that the output beams 30a and 30b impinge on the correct target (and in certain cases the correct area/portion/region of the target), the optical arrangements 18a and 18b, typically in the form of respective telescopes, are respectively deployed to define a field of view corresponding to the to which the output beams 30a and 30b are to impinge and the region from which the reflected radiation will arrive. Each of the telescopes 18a and 18b has an aperture which defines the effective aperture of the respective optical assemblies 16a and 16b.

The telescope 18a directs the coherent sub-beams generated by the beam emitting subsystem 14a towards the target such that the sub-beams combine (constructively interfere), at or before reaching the target 32, so as to form the output beam 30a. While the telescope 18a directs the aforesaid coherent sub-beam towards the target 32, the telescope 18a also collects the radiation reflected from the target 32, including the reflected radiation components 36a and 36b. The telescope 18a is configured to direct the coherent sub-beams generated by the beam emitting subsystem 14a to the target 32, and to collect the reflected radiation through a single aperture of the telescope 18a (which defines the effective aperture of the optical assembly 16a), such that the outgoing beam 30a transmitted through the telescope 18a and the reflected radiation received by the telescope 18a (i.e., beams 36a and 36b) share a common propagation path through the atmosphere.

Similarly, the telescope 18b directs the coherent sub-beams generated by the beam emitting subsystem 14b towards the target such that the sub-beams combine (constructively interfere), at or before reaching the target 32, so as to form the output beam 30b. While the telescope 18b directs the aforesaid coherent sub-beam towards the target 32, the telescope 18b also collects the radiation reflected from the target 32, including the reflected radiation components 38a and 38b. The telescope 18b is configured to direct the coherent sub-beams generated by the beam emitting subsystem 14a to the target 32, and to collect the reflected radiation through a single aperture of the telescope 18b (which defines the effective aperture of the optical assembly 16b), such that the outgoing beam 30b transmitted through the telescope 18b and the reflected radiation received by the telescope 18b (i.e., beams 38a and 38b) share a common propagation path through the atmosphere.

It is noted that the intensities of the reflected radiation collected by the telescopes 18a and 18b may not necessarily be identical due to the different deployment locations of the telescopes 18a and 18b and optical variations in the medium 34 traversed by the reflected radiation. For example, the reflected radiation component 36a (i.e., the reflected portion of the beam 30a received by the telescope 18a) may have a first intensity when received at the telescope 18a, while the reflected radiation component 38a (i.e., the reflected portion of the beam 30a received by the telescope 18b) may have a second intensity when received at the telescope 18b. Likewise, the reflected radiation component 36b (i.e., the reflected portion of the beam 30b received by the telescope 18a) may have a first intensity when received at the telescope 18a, while the reflected radiation component 38b (i.e., the reflected portion of the beam 30b received by the telescope 18b) may have a second intensity when received at the telescope 18b.

The telescopes (optical arrangements) 18a and 18b are represented schematically in FIG. 1 by lenses 18a and 18b, but can typically be assemblies of lenses, which may be refractive or reflective, or any combination thereof, to form an appropriate telescope, as is known in the art. Each of the telescopes 18a and 18b preferably includes common large-aperture focusing optics for directing the coherent sub-beams collectively towards the target 32 so as to combine at or before reaching the target 32. Within the context of this document, coherent sub-beams that are combined at or before reaching the target generally refers to coherent sub-beams that are either brought into coherent combination at the target, or brought into coherent combination before the target and sustain coherent combination over the remaining distance to the target.

Selective optical elements 20a and 20b are deployed between the beam emitting subsystems 14a and 14b and the telescope arrangement 18a and 18b so as to selectively control which radiation propagates (i.e., is guided) along which of the optical paths of the optical assemblies 16a and 16b. In particular, the selective optical elements 20a and 20b selectively control which radiation propagates (via the transmission channel) from the beam emitting subsystems 14a and 14b to the telescopes 18a and 18b and further on towards the target 32 (along one of the optical paths defined by optical assemblies 16a and 16b), and which received radiation from the target 32 that is collected by the telescopes 18a and 18b propagates (via the receiving channel) from the telescopes 18a and 18b to the photodetectors 26a and 26b (along the other one of the optical paths defined by optical assemblies 16a and 16b). The selective control by the selective optical elements 20a and 20b is enabled by discriminating between different types of light, such that a certain type of light (radiation) that is incident to an incident surface of the selective optical elements 20a and 20b is transmitted by the selective optical elements 20a and 20b, and another type of light that is incident to an incident surface of the selective optical elements 20a and 20b is reflected by the selective optical elements 20a and 20b. In certain preferred implementations, the selective optical elements 20a and 20b are spectrally selective beam splitter optical elements, such as dichroic mirrors, whereby the discrimination is based on the wavelength (spectral characteristics) of the light that is incident to the incident surfaces of the selective optical elements 20a and 20b such that light of certain wavelengths is transmitted by the selective optical elements 20a and 20b and light of other wavelengths is reflected by the selective optical elements 20a and 20b. In such implementations, a dichroic (i.e., spectrally selective) coating may be applied to the generally opposing major external surfaces 21a and 23a of the selective optical component 20a to form a dichroic mirror which transmits or reflects light in a first range of wavelengths, and reflects or transmits light in a second range of wavelengths that is non-overlapping with the first range of wavelengths. Similarly, a dichroic coating may be applied to the generally opposing major external surfaces 21b and 23b of the selective optical component 20b to form a dichroic mirror which reflects or transmits light in the first range of wavelengths, and transmits or reflects light in the second range of wavelengths.

The discrimination functionality provided by the selective optical component 20a allows the sub-beams emitted by the beam emitting subsystem 14a to propagate to the telescope 18a (for directing towards the target 32) along one of the two optical paths (via the transmission channel) of the optical assembly 16a while simultaneously allowing only the reflected radiation component 36b (i.e., the reflected portion of the beam 30b received by the telescope 18a) to propagate onward to the photodetector 26a along the other of the two optical paths of the optical assembly 16a (via the receiving channel). Note that the selective optical component 20a prevents the reflected radiation component 36a from propagating via the receiving channel onward to the photodetector 26a. Similarly, the discrimination functionality provided by the selective optical component 20b allows the sub-beams emitted by the beam emitting subsystem 14b to propagate to the telescope 18b (for directing towards the target 32) along one of the two optical paths (via the transmission channel) of the optical assembly 16b while simultaneously allowing only the reflected radiation component 38a (i.e., the reflected portion of the beam 30a received by the telescope 18b) to propagate onward to the photodetector 26b along the other of the two optical paths (via the receiving channel) of the optical assembly 16b. Note that the selective optical components 20b prevents the reflected radiation component 38b from propagating via the receiving channel onward to the photodetector 26b.

In the non-limiting example illustrated in FIG. 1, the selective optical component 20a (implemented as a dichroic mirror or a set of dichroic mirrors) is configured to transmit incident radiation in a first range of wavelengths, that includes the center wavelength of the output beam 30a, such that the output beam 30a (radiation) emitted by the beam emitting subsystem 14a that is incident to the surface 21a is transmitted by the selective optical component 21a to the telescope 18a. The selective optical component 20a is further configured to reflect incident radiation in a second range of wavelengths, that is non-overlapping with the first range of wavelengths and that includes the center wavelength of the reflected radiation components 36b, such that the reflected radiation component 36b (i.e., the reflected portion of the beam 30b collected by the telescope 18a) that is incident to the surface 23a is reflected by the selective optical component 21a towards the photodetector 26a. In this configuration, the reflected radiation component 36b (i.e., the reflected portion of the beam 30a collected by the telescope 18a) that is incident to the surface 23a is not transmitted by the selective optical component 21a, such that the reflected radiation component 36b is substantially prevented from reaching the detector 26a.

Similarly, the selective optical component 20b (implemented as a dichroic mirror or a set of dichroic mirrors) is configured to transmit incident radiation in a certain range of wavelengths, preferably the second range of wavelengths that includes the center wavelength of the output beam 30b, such that the output beam 30b (radiation) emitted by the beam emitting subsystem 14b that is incident to the surface 21b is transmitted by the selective optical component 21b to the telescope 18b. The selective optical component 20b is further configured to reflect incident radiation in another range of wavelengths, preferably the first range of wavelengths that includes the wavelength of the reflected radiation components 38a, such that the reflected radiation component 36a (i.e., the reflected portion of the beam 30a collected by the telescope 18b) that is incident to the surface 23b is reflected by the selective optical component 21b towards the photodetector 26b. In this configuration, the reflected radiation component 38b (i.e., the reflected portion of the beam 30b collected by the telescope 18b) that is incident to the surface 23b is not transmitted by the selective optical component 21b, such that the reflected radiation component 38b is substantially prevented from reaching the detector 26b.

As mentioned, for a given transceiver it is preferable that the center wavelengths of the radiation transmitted and received by the transceiver are selected so that they are measurably different wavelengths, but are also relatively close to each other within the same region of the electromagnetic spectrum. If using, for example, Ytterbium (Yb) fiber lasers in the beam emitting subsystems, the two center wavelengths could be at approximately 1060 nanometers (nm) and 1070 nm, which are different enough to enable separation by dichroic mirrors, yet close enough to each other that they are both near the optimal gain region of the Yb fiber lasers.

Parenthetically, since the intensity of the output beams 30a, 30b is typically roughly 7-11 orders of magnitude higher than the intensity of the received reflected radiation, the selective optical components 20a, 20b may backscatter or leak radiation from the output beams 30a, 30b back towards the photodetectors 26a, 26b. A narrow passband optical filter may advantageously be deployed between the selective optical components 20a, 20b and the photodetectors 26a, 26b to block the residual high-power radiation from output beams 30a, 30b from reaching the photodetectors 26a, 26b, thereby enhancing the signal-to-noise ratio at the photodetectors 26a, 26b.

It is noted that other configurations of the selective optical components 20a and 20b besides the configuration shown in FIG. 1 are possible. For example, the selective optical component 20a may be configured to reflect the radiation emitted by the beam emitting subsystem 14a (i.e., the output beam 30a) that is incident to the surface 21a to the telescope 18a, and to transmit the reflected radiation component 36b (i.e., the reflected portion of the beam 30b) that is incident to the surface towards the photodetector 26a. In order to ensure that the output beam 30a and the reflected radiation reach the correct respective destinations, the selective optical component 20a can be rotated ninety degrees (about the axis normal to the plane of the paper) and the beam emitting subsystem 14a can be repositioned accordingly (below the selective optical component 20a). As should be apparent, the positions of the adaptive optical element 22a, focusing optics 24a, and photodetector 26a would also require adjustment to allow propagation of the component of the reflected radiation to the photodetector 26a. Similar alternative configurations of the selective optical component 20b are also contemplated herein. In fact, such configurations in which one or both of the output beams 30a and 30b undergoes a reflection (by the selective optical components 20a and 20b) before reaching the telescopes 18a and 18b is generally preferable, since transmission of high-power output beams by dichroic mirrors 20a, 20b may cause optical distortions due to heating effects of the material (glass) in the dichroic mirrors.

The adaptive optical element 22a is deployed in the optical path between the selective optical component 20a and the photodetector 26a, and is configured to guide the component of the reflected radiation—corresponding to the reflected radiation component 36b— from the selective optical component 20a to the photodetector 26a. The adaptive optical element 22b is deployed in the optical path between the selective optical component 20b and the photodetector 26b, and is configured to guide the component of the reflected radiation—corresponding to the reflected radiation component 38a— from the selective optical component 20b to the photodetector 26b. In addition to deflecting the light from the selective optical components 20a and 20b to the photodetectors 26a and 26b, the adaptive optical elements 22a and 22b perform additional functions used for image correction by utilizing certain adaptive features of the adaptive optical elements 22a and 22b, as will be discussed in subsequent sections of the present disclosure. The adaptive optical elements 22a and 22b are preferably implemented as deformable mirrors, which typically have adaptive features in the form of a reflective surface (designated as 25a and 25b in the drawings) which can be selectively deformed by a plurality of actuators according to deforming parameters. The deformable mirrors 22a and 22b can be implemented using any suitable deformable mirror technology including, but not limited to, MEMS actuated mirrors, electrostatically actuated mirror membranes, piezoelectric actuated mirrors, and magnetic actuated mirrors.

Focusing optics, represented schematically by lenses 24a and 24b, are preferably associated with the deformable mirrors 22a and 22b. The radiation reflected by the deformable mirrors 22a and 22b is focused onto the photodetectors 26a and 26b by the associated focusing optics 24a and 24b, so as to form an image of the target 32 and the area of the target ("spot") illuminated by the respective beams 30b and 30b). Preferably, the diameter of the active area of the photodetectors 26a and 26b is on the order of one-to-several diffraction limits of the imaging systems (i.e., the optical assemblies 16a and 16b).

In addition to forming the images, each of the photodetectors 26a and 26b monitors (measures) an intensity parameter of the received radiation that varies as a function of an intensity of the radiation impinging on the area of the target 32. In response to sensing the radiation, each of the photodetectors 26a and 26b generates a signal (intensity parameter) indicative of the intensity of the radiation impinging on the area of the target 32. In particular, the signal generated by the photodetector 26a varies as a function of the intensity of the radiation impinging on the target 32 in response to illumination by the output beam 30b, and is indicative of the intensity of the radiation impinging on the target 32 in response to illumination by the output beam 30b emitted by the beam emitting subsystem 14b. Similarly, the signal generated by the photodetector 26b varies as a function of the intensity of the radiation impinging on the target 32 in response to illumination by the output beam 30a, and is indicative of the intensity of the radiation impinging on the target 32 in response to illumination by the output beam 30a emitted by the beam emitting subsystem 14a.

A control subsystem 29 is associated with the transceivers 12a and 12b, and in particular is associated with the photodetectors 26a and 26b, the beam emitting subsystems 14a and 14b, and the deformable mirrors 22a and 22b. The control subsystem 29 is configured to modify transmission and receiving parameters of the transceivers 12a and 12b based on the signals generated by the detectors 26b and 26a. In certain embodiments, and as will be discussed further below, the control subsystem 29 modifies the transmission parameters of the transceivers 12a and 12b by actuating the beam emitting subsystems 14a and 14b to modify beam parameters of the coherent beams, and modifies the receiving parameters of the transceivers 12a and 12b by deforming the deformable minors 22a and 22b.

The control subsystem 29 includes logic circuitry, which may be implemented as suitably configured hardware using digital and/or analog processing, including but not limited to, one or more application specific integrated circuit (ASIC), one or more field programmable gate array (FPGA), one or more digital signal processor (DSP), as a general purpose computing system configured by software operating under a suitable operating system, or by any hardware/software/firmware combination configured to perform the functions described herein at a suitable rate. The control subsystem 29b typically also includes at least one data storage device (e.g., non-volatile and/or volatile memory) and suitable input and output interfaces for receiving signal input from the photodetectors 26a and 26b, and for controlling the beam emitting subsystems 14a and 14b and the deformable mirrors 22a and 22b (either directly or indirectly).

In the non-limiting example implementation illustrated in FIG. 1, the control subsystem 29 is shown as having two controllers (designated 28a and 28b), where the controllers 28a and 28b are part of the respective transceivers 12a and 12b, and each of the controllers 28a and 28b includes logic circuitry, data storage, and input/output interfaces, in accordance with the corresponding description of the control subsystem 29 above.

The control subsystem 29, in addition to including the controllers 28a and 28b, also preferably includes or is linked to any communication components necessary for supporting low-latency data communication between the controllers 28a and 28b and command/control input to the transceivers 12a and 12b. Typically, the controllers 28a and 28b are linked to each other via, for example, a data link, which may be a wired data link or a wireless data link. In certain embodiments, the data link is embodied as a low-latency data bus or as a low-latency communication link of a communication network (including, for example, a wired network, an optical fiber connection, or a free space optical communication network). The term "low-latency" generally refers to a latency of preferably no more than 1 millisecond (ms). When embodied as a communication link, each of the controllers 28a and 28b includes or is locally coupled to communications hardware and/or software components for transmitting/receiving data along the data link. Preferably, the transceivers 12a and 12b are in close proximity to each other, more preferably deployed within a single modular housing, such that the effects of the physical distance between the control subsystem 29 and the transceivers 12a and 12b on the speed at which data, including command/control data for controlling major components of the transceivers 12a and 12b, is transmitted along the data link is negligible.

In the implementation illustrated in FIG. 1, the controllers 28a and 28b are directly linked to the respective photodetectors 26a and 26b and are configured to receive input from the photodetectors 26a and 26b. The input received from the photodetectors 26a and 26b may be in the form of output signals produced by the respective photodetectors 26a and 26b, where the output signals are the signals generated by the photodetectors 26a and 26b in response to the receiving incident radiation, or where the output signals are other signals or parameters (e.g., command signals) derived from those generated signals. Since the controllers 28a and 28b generally form part of a single control subsystem 29, the controllers 28a and 28b are also linked to the photodetectors 26b and 26a. This cross-linking between the controllers 28a and 28b and the photodetectors 26b and 26a may be effectuated, for example, via the data link between the controllers 28a and 28b, whereby the photodetector 26a provides its generated signals to the controller 28b indirectly via the controller 28a, and the photodetector 26b provides its generated signals to the controller 28a indirectly via the controller 28b.

The output signals may be provided to the control subsystem 29 (controllers 28a and 28b) as analog signals for subsequent analog processing by the control subsystem 29, or may be digitized in order to provide to the control subsystem 29 digital signals for subsequent digital processing by the control subsystem 29. Digitization may be achieved by converting analog signal output from the control subsystem 29 to digital output via analog-to-digital (A/D) conversion circuitry embodied as one or more A/D converters. In certain embodiments, the photodetectors 26a and 26b include embedded A/D conversion circuitry which enable the photodetectors 26a and 26b to directly output digital signals. Alternatively, the output signals may be provided to the controller 29 as-is without need for further processing.

The signals, provided by the photodetectors 26b and 26a, are used by the control subsystem 29 to modify the transmission parameters of the transceivers 12a and 12b so as to optimize beam intensity of the output beams 30a and 30b. In certain non-limiting implementations, the signal generated by the photodetector 26b (or a signal or parameter derived therefrom) is provided to the control subsystem 29 (i.e., the controller 28a) to optimize the beam intensity of the output beam 30a, and the signal generated by the photodetector 26a (or a signal or parameter derived therefrom) is provided to the control subsystem 29 (i.e., the controller 28b) to optimize the beam intensity of the output beam 30b. In other implementations, the controller 29 may process received signals or inputs received from the photodetectors 26a and 26b in order to modify the transmission parameters of the transceivers 12a and 12b. In one implementation, for each beam emitting subsystem the transmission parameters are modified for beam intensity optimization by adjusting a beam parameter of one or more of the coherent beams that forms the corresponding output beam. In a particularly preferred implementation, the beam parameters are the current phases of the coherent sub-beams, and the control subsystem 29 (via the controllers 28a and 28b) controls the phase modulators of the respective beam emitting subsystems 14a and 14b to shift the current phase of each of the sub-beams to bring the sub-beams into coherent combination thereby optimizing the intensity of the output beams 30a and 30b. In this implementation, the signals received by the control subsystem 29 are used to optimize beam intensity by performing phase correction of the phases of the sub-beams generated by the beam emitting subsystems 14a and 14b so as to achieve effective coherent combination of the sub-beams for each of the output beams 30a and 30b.

In general, for each of the transceivers 12a and 12b, the signal generated by the photodetector of one of the transceivers (or a signal or parameter derived therefrom) is provided to the control subsystem 29 while each phase modulator of the beam emitting subsystem of the other of the transceivers is actuated by the control subsystem 29 to modulate a current phase of the correspondingly transmitted sub-beam between at least three phase states (typically an initial "unmodified" phase state and two "modified" phase states). In a non-limiting implementation, the signal is analyzed (by the controller) to identify variations in the measured intensity parameter resulting from the modulation of the current phase of each transmitted sub-beam relative to a sum of all other sub-beams. The control subsystem then calculates (based on the identified variations) a phase offset of the current phase for each sub-beam relative to a representative phase of the sum of all the other sub-beams emitted by that particular beam emitting subsystem.

This process of modulating the phase of the sub-beams, identifying corresponding variations in the measured intensity parameter, calculating the phase offset of a sub-beam and correction of that phase offset are preferably repeated in rapid cycles, thereby correcting in real-time for dynamic variations in the operating conditions, which may result from fluctuations in the beam generating hardware or from fluctuating atmospheric conditions caused by atmospheric turbulence. Further details of this process can be found in WO 2020/016824 A1, which is hereby incorporated by reference in its entirety herein.

In addition to modifying transmission parameters by adjusting the beam parameter of the one or more coherent beams for optimizing intensity of the output beams 30a and 30b, the control subsystem 29 is also configured to modify receiving parameters of the transceivers 12a and 12b by dynamically adjusting the deformable mirrors 22a and 22b based on the signals generated the photodetectors 26a and 26b to perform image correction of the images of the target 32 and the target spot formed on the photodetectors 26a and 26b. The image correction enables the system 10 to more accurately correct, in real-time, for dynamic variations in the operating conditions, specifically optical distortions in the reflected radiation resultant from fluctuating atmospheric conditions caused by atmospheric turbulence.

Previous approaches for image correction relied on deploying a deformable mirror together with a wavefront sensor (such as a Shack-Hartman wavefront sensor) and a beam splitter for each beam emitting subsystem. For example, one such approach is described in WO 2020/016824 A1, in which collected image light from a telescope is directed from a deformable mirror through a wavefront sensor, the output of which is processed by an adaptive optics control system to provide closed-loop feedback to adjust the deformable mirror so as to reduce optical distortions in the image (of the target) provided to the deformable by the telescope. The other channel from the beamsplitter is passed on to a photodetector, which monitors the aforementioned intensity parameter so as to generate output signals which are provided to a controller configured to actuate the phase modulators to modulate a current phase, identify variations in the measured intensity parameter, calculate the phase offset of a sub-beam and perform a correction of that phase offset. By reducing the optical distortions via dynamic adjustment of the deformable mirror, the photodetector is able to generate a "cleaner" signal (i.e., a less distorted signal), thereby increasing the efficacy of the phase offset correction process. However, wavefront sensors are typically only suitable in low-to-moderate turbulent conditions, and do not provide accurate measurements of optical wavefront aberrations in high turbulence conditions. Therefore, this prior approach, which used a deformable mirror and wavefront sensor for image correction in combination with a coherent beam combining system for beam intensity optimization, is limited to operation in low-to-moderate turbulent conditions.

In the present embodiments, the signals (intensity parameter) received by the control subsystem 29 (controllers 28a and 28b) are used as feedback control-input to the deformable mirrors 22a and 22b, thereby avoiding the use of a wavefront sensor with any of the beam emitting subsystems 14a and 14b. This makes the system 10 ideally suited for operation in various conditions of turbulence, including high turbulence conditions. Looking at the transceiver 12a as an example, since the output beam 30a and the reflected radiation components 36b traverse the same optical path (propagation path) between the transceiver 12a and the target 32, and the wavelengths of the beams 30a and 36a are similar (i.e., are close to each other), the beams 30a and 36a experience the same or similar optical distortions due to atmospheric turbulence, gravity or heating effects in the telescope 18a, and optical blooming. The same is true for the propagation of the output beam 30b and the reflected radiation components 38a for the transceiver 12b.

Therefore, the signals generated by the photodetector 26a and 26b can be used to reduce the effects of these optical distortions. In particular, the signals generated by the photodetector 26a and 26b are used by the control subsystem 29 (controllers 28b and 28a) to dynamically adjust the deformable mirrors 22b and 22a to reduce distortions in the wavefront received from the telescopes 18b and 18a. Specifically, the signal generated by the photodetector 26a is used by the control subsystem 29 (i.e., the controller 28b) to adjust the deformable mirror 22b by deforming the reflective surface 25b so as to reduce distortions in the wavefront received from the telescope 18b, and the signal generated by the photodetector 26b is used by the control subsystem 29 (i.e., the controller 28a) to adjust the deformable mirror 22a by deforming the reflective surface 25a so as to reduce distortions in the wavefront received from the telescope 18a. Similar to as discussed above with reference to beam optimization, the control subsystem 29 may receive the signals generated by the photodetectors 26a and 26b as input, and apply those signals to the deformable mirrors. Alternatively, the control subsystem 29 may process those received generated signals and apply the processed signals to the deformable mirrors. Further still, the control subsystem 29 may receive input derived from the generated signals and apply those inputs (or processed inputs) to the deformable mirrors.

It is noted that the beam intensity optimization functionality enabled by the system 10 presents independent utility from the image correction functionality. Therefore, embodiments of the system are contemplated in which image correction functionality is not employed. In such embodiments, the deformable mirrors 22a and 22 (and focusing optics 24a and 24b) are absent from the optical assemblies 16a and 16b such that the dichroic mirrors 20a and 20b guide the reflected radiation components 36b and 38a directly to the photodetectors 26a and 26b.

Figure 3:
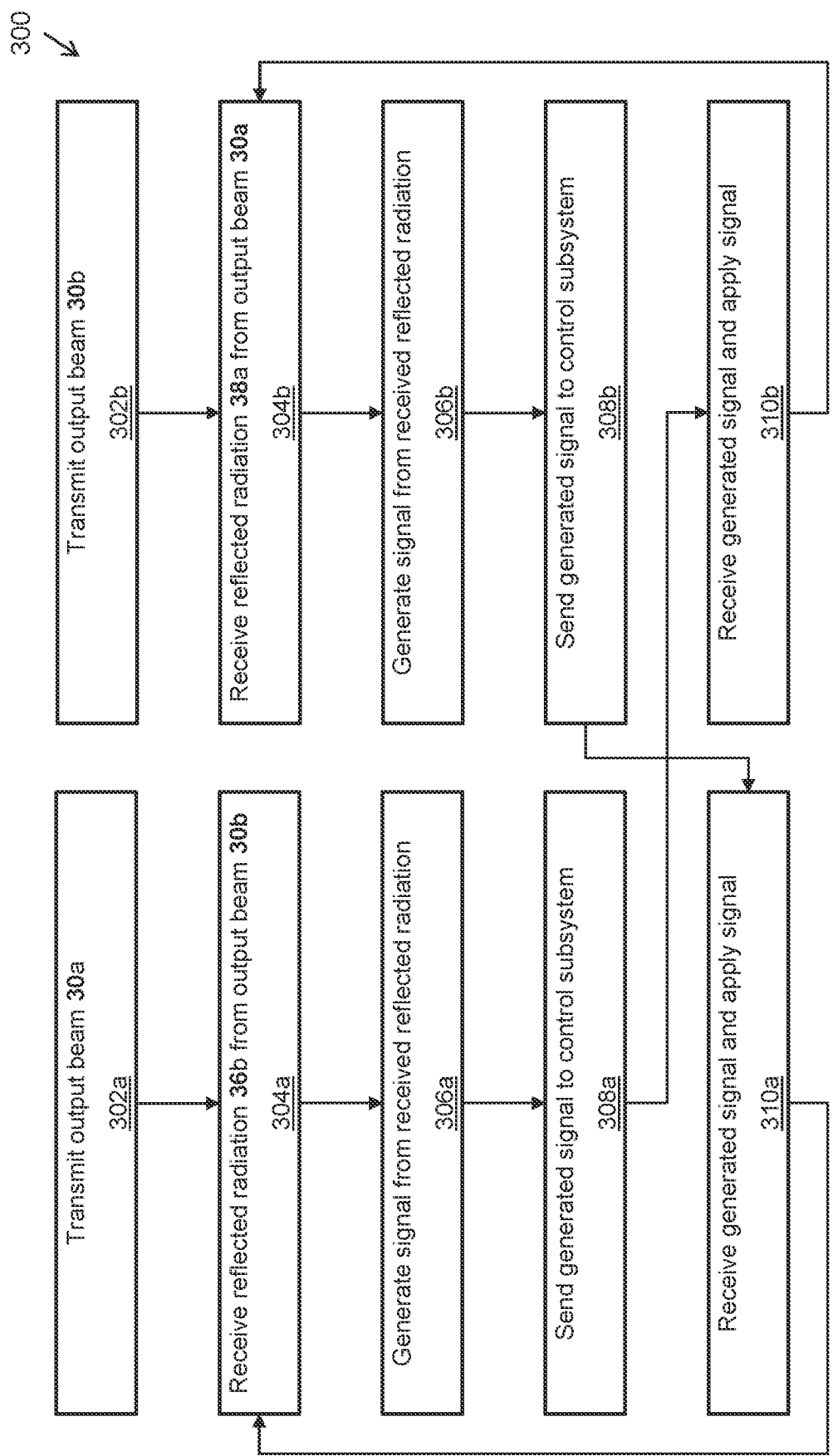
FIG. 3 is a flow diagram illustrating a process for transmitting beams towards a target and receiving radiation reflected from the target in order to provide signals for beam intensity optimization and image correction.

Attention is now directed to FIG. 3 which shows a flow diagram detailing a process (method) 300 in accordance with embodiments of the disclosed subject matter. The process includes steps for transmitting (emitting) beams and receiving reflected radiation by each of the transceivers 12a and 12b, and for generating signals from collected reflected radiation in order to apply a turbulence-correction. Reference is also made to the elements shown in FIG. 1. The process 300 and the steps (sub-processes) of FIG. 3 are performed by the system 10 and its associated components, including, for example, the beam emitting subsystems 14a and 14b, the optical assemblies 16a and 16b (and its sub-components), the photodetectors 26a and 26b, and the control subsystem 29 (controllers 28a and 28b). The sub-processes of the process 300 are preferably performed automatically, and are preferably performed in real-time.

The process 300 begins at either or both of steps 302a and 302b, where the system 10 is initiated and begins transmitting output beams 30a and 30b to a common target. Steps 302a and 302b are effectuated by the beam emitting subsystems 14a and 14b generating respective output beams 30a and 30b which are directed by respective optical assemblies 16a and 16b towards the target (e.g., the target 32). Steps 302a and 302b may be executed approximately concurrently such that the output beams 30a and 30b are emitted approximately simultaneously. Alternatively, one of steps 302a and 302b may be executed before the other of the steps 302a and 302b such that one of the output beams 30a and 30b is emitted before the other of the output beams 30a and 30b.

At steps 304a and 304b, the reflected radiation from the transmitted output beams 30b and 30a is received by the photodetectors 26a and 26b. In particular, the reflected radiation from the transmitted output beams is collected by the telescopes 18a and 18b, and the dichroic mirrors 20a and 20b direct/guide the reflected radiation from the output beams 30b and 30a (i.e., the reflected radiation components 36b and 38a) to the photodetectors 26a and 26b such that the photodetector 26a receives the reflected radiation component 36b and the photodetector 26b receives the reflected radiation component 38a. At steps 306a and 306b, the photodetectors 26a and 26b generate turbulence-correction signals (for phase correction (i.e., beam intensity optimization) and image correction) from the received reflected radiation components 36b and 38a. At steps 308a and 308b the photodetectors send the generated signals (or a signal or parameter derived therefrom) to the control subsystem 29.

At steps 310a and 310b the control subsystem 29 receives the signals (i.e., controller 28a receives the signal generated by the photodetector 26b (or a signal or parameter derived therefrom), and the controller 28b receives the signal generated by the photodetector 26a (or a signal or parameter derived therefrom)). The control subsystem 29 then modifies the transmission and/or receiving parameters of the transceivers 12a and 12b to perform phase correction and image correction, based on the turbulence-correcting signals. As discussed, the control subsystem 29 may receive the turbulence-correcting signals generated by the photodetectors 26a and 26b as input, and apply those signals to the transceivers 12b and 12a so as to modify the transmission and/or receiving parameters of the transceivers 12b and 12a. Alternatively, the control subsystem 29 may process those received turbulence-correcting signals and apply the processed signals to the transceivers 12b and 12a. Further still, the control subsystem 29 may receive input from the photodetectors that is derived from the turbulence-correcting signals and apply those inputs (or may process those received inputs and apply those processed inputs) to the transceivers 12b and 12a. In particular, the transmission parameters of the transceivers 12a and 12b are modified by modifying beam parameters of the coherent beams generated by beam emitting subsystems 14a and 14b to perform phase correction, and the receiving parameters of the transceivers 12a and 12b are modified by deforming the reflective surface of the deformable mirrors 22a and 22b to perform image correction.

From steps 310a and 310b, the process 300 returns to steps 304a and 304b, where the reflected radiation from the phase corrected output beams 30a and 30b is received by the photodetectors 26a and 26b. If the image correction is applied as part of steps 310a and 310b, the reflected radiation components 36b and 38a are reflected to the photodetectors 26a and 26b with the image-corrected deformable mirrors so as to form corrected images of the target and illuminated spot on the photodetectors 26a and 26b.

The image correction performed by deforming the deformable mirror 22b improves the quality of the signal generated by the photodetector 26b, and therefore improves the precision of the phase offset (error) calculation by the controller 28a, which in turn improves the precision of the deformation of the deformable mirror 22a (in response to control input from the controller 28a), thereby improving the quality of the signal generated by the photodetector 26a, and the precision of phase error calculation by the controller 28b, and the precision of the deformation of the deformable mirror 22b (in response to control input from the controller 28b), and so on and so forth. Even if the photodetectors 26a, 26b initially produce distorted and output signals of poor quality, the positive feedback loop will incrementally improve both the optical distortion and phase error between sub-beams for both beam emitting subsystems 14a, 14b.

The steps of the process 300 are preferably repeated in rapid cycles, thereby correcting in real-time for dynamic variations in the optical distortion. In various practical implementations, rapid repetition of these cycles performed repeatedly at least 100 times per second may be highly effective for correcting the effects of moderate to high atmospheric turbulence. The steps of the process 300 may be repeated until illumination of the target by the output beams 30a and 30b is no longer required (which in the high-energy laser or directed-energy weapons context may be once the target is destroyed or disabled), at which point a master control system that controls operation of the system 10 may provide a beam emission termination command to the transceivers 12a and 12b so as to cease emission of the output beams 30a and 30b.

Figure 4:
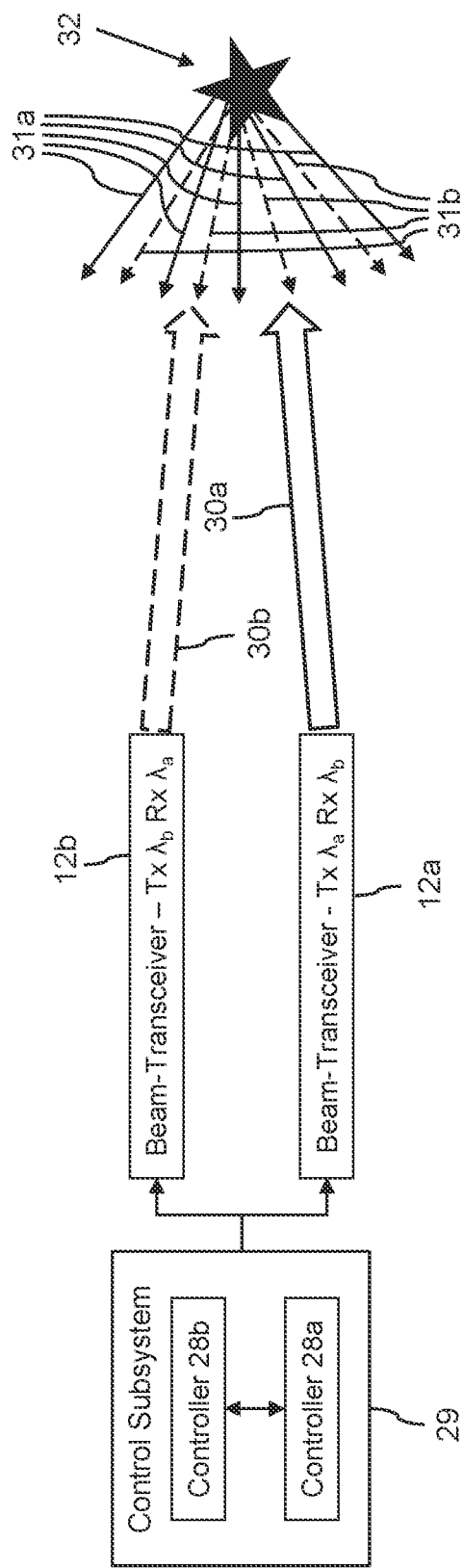
FIG. 4 is a schematic representation of the transmission and reception scheme used by the system of FIGS. 1.

Although the embodiments of the present disclosure have described thus far within the context of two transceivers, the principles of the present disclosure may be equally applicable to implementations that use more than two transceivers in the set of transceivers. Before generally describing an implementation that utilizes three transceivers, attention is first directed to FIG. 4, which schematically illustrates the transmission and reception scheme of the present disclosure for the particular case of two transceivers. As shown in FIG. 4, and as previously described in detail, the transceiver 12a emits and directs (transmits, i.e., Tx) the beam 30a (at a first wavelength $\lambda_a$) towards the target 32, and the transceiver 12b emits and directs (Tx) the beam 30b (at a second wavelength $\lambda_b$) towards the target 32. The reflected radiation due to beam 30a impinging on (i.e., illuminating) the target 32 is represented by solid arrows designated as 31a, and the reflected radiation due to beam 30b impinging on (i.e., illuminating) the target 32 is represented by dashed arrows designated as 31b. The transceiver 12a collects the radiation reflected from the target 32, and using a selective optical component 20a, allows only the radiation 31b (reflection of the beam 30b) to reach the photodetector 26a (i.e., the photodetector 26a receives (Rx) reflected radiation at the second wavelength $\lambda_b$). The transceiver 12b collects the radiation reflected from the target 32, and using a selective optical component 20b, allows only the radiation 31a (reflection of the beam 30a) to reach the photodetector 26b (i.e., the photodetector 26a receives (Rx) reflected radiation at the first wavelength $\lambda_a$). The transceiver 12a provides the phase correction and image correction signal (referred to collectively as a "turbulence-correction signal") to the transceiver 12b, and the transceiver 12b provides the turbulence-correction signal to the transceiver 12a.

Figure 5:
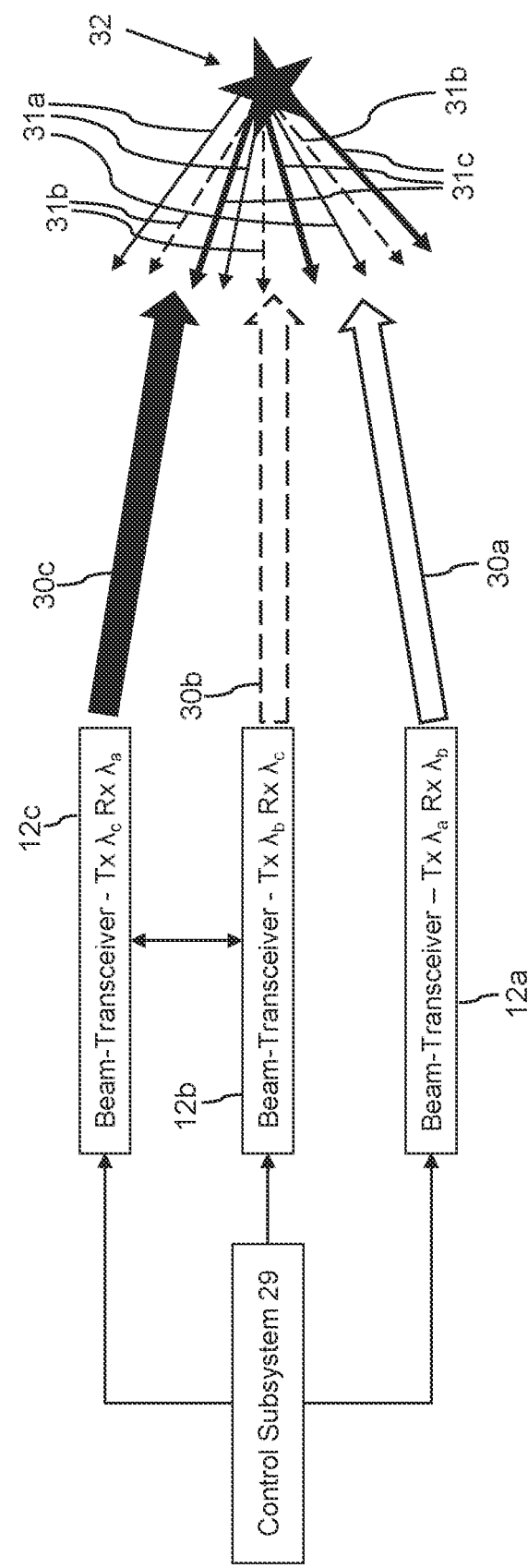
FIG. 5 is a schematic representation of a transmission and reception scheme used by a system, similar to the system of FIG. 1, but with three transceivers, each configured to transmit radiation at one respective wavelength and receive radiation at a different respective wavelength.

FIG. 5 schematically illustrates the transmission and reception scheme of the present disclosure expanded to the particular case of three transceivers. Here, the transceiver 12a emits and directs the beam 30a (at a first wavelength $\lambda_a$) towards the target 32, the transceiver 12b emits and directs the beam 30b (at a second wavelength $\lambda_b$) towards the target 32, and the transceiver 12c emits and directs the beam 30c (at a third wavelength)$\lambda_c$) towards the target. The reflected radiation due to beam 30a impinging on the target 32 is represented by solid arrows designated as 31a, the reflected radiation due to beam 30b impinging on the target 32 is represented by dashed arrows designated as 31b, and the reflected radiation due to beam 30c impinging on the target 32 is represented by solid thick arrows designated 31c.

For each of the transceivers, the dichroic mirror of the optical assembly is configured to allow radiation at the wavelength of the output beam to propagate via the telescope to the target 32, and to allow radiation at only one of the other two wavelengths to propagate from the telescope to the photodetector. For example, and using an optical assembly configuration similar to the configuration illustrated in FIG. 2, the dichroic mirror of transceiver 12a may be configured to transmit radiation at the first wavelength $\lambda_a$ and reflect radiation at the second wavelength Ab, the dichroic mirror of transceiver 12b may be configured to transmit radiation at the second wavelength $\lambda_b$ and reflect radiation at the third wavelength $\lambda_c$, and the dichroic mirror of transceiver 12c may be configured to transmit radiation at the third wavelength $\lambda_c$, and reflect radiation at the first wavelength $\lambda_a$. As a result, the transceiver 12a transmits radiation at the first wavelength $\lambda_a$ (i.e., beam 30a), and the photodetector of the transceiver 12a receives radiation at the second wavelength $\lambda_b$ (i.e., corresponding to the reflection of the beam 30b emitted by the transceiver 12b). The transceiver 12b transmits radiation at the second wavelength $\lambda_b$ (i.e., beam 30b), and the photodetector of the transceiver 12b receives radiation at the third wavelength $\lambda_c$ (i.e., corresponding to the reflection of the beam 30c emitted by the transceiver 12c). The transceiver 12c transmits radiation at the third wavelength $\lambda_c$ (i.e., beam 30c), and the photodetector of the transceiver 12c receives radiation at the first wavelength $\lambda_a$ (i.e., corresponding to the reflection of the beam 30a emitted by the transceiver 12a). Accordingly, the transceiver 12a provides the turbulence-correction signal to the transceiver 12b, the transceiver 12b provides the turbulence-correction signal to the transceiver 12c, and the transceiver 12c provides the turbulence-correction signal to the transceiver 12a.

As should be apparent, this concept can be generalized to the case of N transceivers, where each transceiver receives a turbulence-correction signal from one of the other transceivers, and provides a turbulence-correction signal to another one of the transceivers. An example configuration for a battery (i.e., set or group) composed of N transceivers is provided, where the $j^{th}$ transceiver is denoted as $TS_j$. For $j = 1 \ldots N-1$, $TS_j$ transmits a beam at wavelength $\lambda_j$ and its photodetector receives radiation at wavelength $\lambda_{j+1}$, and $TS_N$ transmits a beam at wavelength AN and its photodetector receives radiation at wavelength $\lambda_1$. Here, for $j = 1 \ldots N-1$, the photodetector of $TS_j$ provides the turbulence-correction signal to the control subsystem 29 so as to control $TS_{j+1}$, and the photodetector of $TS_N$ provides the turbulence-correction signal to the control subsystem 29 so as to control $TS_1$. It is noted however that optical limitations of the dichroic mirrors and other components of the transceivers may limit the overall performance of a system that uses more than three or four such subsystems. As the number of transceivers increases, the dichroic mirrors deployed in each subsystem are required to discriminate between radiation of a larger number of different wavelengths. Along the receiving channel for each of the optical assemblies, a proportion of unwanted radiation (for example radiation at the second wavelength for the receive channel of the transceiver 12a described with reference to FIG. 5) may leak through the dichroic mirror back to the beam emitter subsystem (which can saturate the transmission equipment), and/or may leak through the dichroic mirror to the photodetector. This leakage to the photodetector may result in the photodetector generating a signal that includes components corresponding to unwanted radiation, which can degrade the efficacy of the turbulence-correction signal that is to be provided to the associated transceiver.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system, comprising:
a first transceiver comprising:
a first beam emitting subsystem configured to generate a first plurality of coherent beams,
a first detector to receive radiation, and
a first optical assembly having an aperture and configured to:
direct the first plurality of coherent beams through the aperture towards a target,
collect, via the aperture, radiation reflected from the target, the collected reflected radiation including at least a first component of radiation corresponding to the first plurality of coherent beams and a second component of radiation corresponding to a second plurality of coherent beams impinging on the target, and
guide the second component of radiation to the first detector,
wherein the first detector is configured to generate, from the second component of radiation, a signal indicative of an intensity of radiation impinging on the target corresponding to the second plurality of coherent beams;
a second transceiver comprising:
a second beam emitting subsystem configured to generate the second plurality of coherent beams,
a second detector to receive radiation, and
a second optical assembly having an aperture and configured to:
direct the second plurality of coherent beams through the aperture of the second optical assembly towards the target,
collect, via the aperture of the second optical assembly, radiation reflected from the target, the reflected radiation collected by the second optical assembly including at least a first component of radiation corresponding the first plurality of coherent beams and a second component of radiation corresponding to the second plurality of coherent beams, and
guide the first component of the reflected radiation collected by the second optical assembly to the second detector,
wherein the second detector is configured to generate, from the first component of the reflected radiation collected by the second optical assembly, a signal indicative of an intensity of radiation impinging on the target corresponding to the first plurality of coherent beams; and
a control subsystem associated with the first transceiver and the second transceiver, the control subsystem configured to: modify at least one parameter of the first transceiver based on the signal generated by the second detector, and modify at least one parameter of the second transceiver based on the signal generated by the first detector.

2. The system of claim 1, wherein the control subsystem modifies the at least one parameter of the first transceiver by actuating the first beam emitting subsystem to adjust a beam parameter of one or more coherent beams of the first plurality of coherent beams based on the signal generated by the second detector, and wherein the control subsystem modifies the at least one parameter of the second transceiver by actuating the second beam emitting subsystem to adjust a beam parameter of one or more coherent beams of the second plurality of coherent beams based on the signal generated by the first detector.

3. The system of claim 1, wherein the first optical assembly includes a first telescope arrangement for directing the first plurality of coherent beams towards the target and for collecting the reflected radiation from the target, and wherein the second optical assembly includes a second telescope arrangement for directing the second plurality of coherent beams towards the target and for collecting the reflected radiation from the target.

4. The system of claim 3, wherein the first telescope arrangement has an aperture that defines the aperture of the first optical assembly, and wherein the first telescope arrangement directs the first plurality of coherent beams towards the target and collects the reflected radiation from the target through the aperture of the first telescope arrangement, and wherein the second telescope arrangement has an aperture that defines the aperture of the second optical assembly, and wherein the second telescope arrangement directs the second plurality of coherent beams towards the target and collects the reflected radiation from the target through the aperture of the second telescope arrangement.

5. The system of claim 3, wherein the first optical assembly further includes a first selective optical element configured to: transmit or reflect radiation emitted by the first beam emitting subsystem to the first telescope arrangement, and reflect or transmit incident radiation received from the first telescope arrangement towards the first detector, and wherein the second optical assembly further includes a second selective optical element configured to: transmit or reflect radiation emitted by the second beam emitting subsystem to the second telescope arrangement, and reflect or transmit incident radiation received from the second telescope arrangement towards the second detector.

6. The system of claim 5, wherein the first optical assembly further includes a first adaptive optical element deployed between the first selective optical element and the first detector in an optical path from the first telescope arrangement to the first detector, the first adaptive optical element configured to: receive radiation from the first selective optical element, and direct the received radiation to the first detector, and wherein the second optical assembly further includes a second adaptive optical element deployed between the second selective optical element and the second detector in an optical path from the second telescope arrangement to the second detector, the second adaptive optical element configured to: receive radiation from the second selective optical element, and direct the received radiation to the second detector.

7. The system of claim 6, wherein the first adaptive optical element includes a deformable reflective surface, and wherein the second adaptive optical element includes a deformable reflective surface, and wherein the control subsystem modifies the at least one parameter of the first transceiver by selectively deforming the reflective surface of the first adaptive optical element based on the signal generated by the second detector, and wherein the control subsystem modifies the at least one parameter of the second transceiver by selectively deforming the reflective surface of the second adaptive optical element based on the signal generated by the first detector.

8. The system of claim 1, wherein the first optical assembly defines a first optical path and a second optical path, and wherein the first plurality of coherent beams propagate from the first beam emitting subsystem to the aperture of the first optical assembly along the first optical path, and wherein the second component of radiation propagates from the aperture of the first optical assembly to the first detector along the second optical path, and wherein the second optical assembly defines a first optical path and a second optical path, and wherein the second plurality of coherent beams propagate from the second beam emitting subsystem to the aperture of the second optical assembly along the first optical path of the second optical assembly, and wherein the first component of the reflected radiation collected by the second optical assembly propagates from the aperture of the second optical assembly to the second detector along the second optical path of the second optical assembly.

9. The system of claim 1, wherein the radiation from the first plurality of coherent beams is centered around a first wavelength, and wherein the radiation from the second plurality of coherent beams is centered around a second wavelength different from the first wavelength.

10. A method, comprising:
generating a first plurality of coherent beams and a second plurality of coherent beams;
transmitting or reflecting, by a selective optical element, the first plurality of coherent beams towards a telescope;
directing, through an aperture of the telescope, the first plurality coherent beams towards a target;
collecting, through the aperture of the telescope, radiation reflected from the target, the reflected radiation collected by the telescope including at least a first component of radiation corresponding the first plurality of coherent beams and a second component of radiation corresponding to the second plurality of coherent beams impinging on the target;
reflecting or transmitting, by the selective optical element, the second component of radiation towards a detector;
generating by the detector from the second component of radiation collected by the telescope, a signal indicative of an intensity of radiation impinging on the target corresponding to the second plurality of coherent beams; and
adjusting at least one beam parameter of one or more of the coherent beams of the second plurality of coherent beams based on the generated signal.

11. The method of claim 10, further comprising:
transmitting or reflecting, by a second selective optical element, the second plurality of coherent beams towards a second telescope;
directing, through an aperture of a second telescope, the second plurality coherent beams towards the target;
collecting, through the aperture of the second telescope, radiation reflected from the target, the reflected radiation collected by the second telescope including at least a first component of radiation corresponding the first plurality of coherent beams and a second component of radiation corresponding to the second plurality of coherent beams impinging on the target;
reflecting or transmitting, by the second selective optical element, the first component of radiation collected by the second telescope towards a second detector;
generating by the second detector from the first component of radiation collected by the second telescope, a signal indicative of an intensity of radiation impinging on the target corresponding to the first plurality of coherent beams; and
adjusting at least one beam parameter of one or more of the coherent beams of the first plurality of coherent beams based on the generated signal.

12. The method of claim 10, further comprising:
receiving, by a deformable mirror, the second component of radiation reflected or transmitted by the selective optical element; and
directing the received second component of radiation to the detector.

13. The method of claim 12, further comprising:
selectively deforming a deformable reflective surface of the deformable mirror based on the generated signal.

14. A system, comprising:
a first transceiver comprising:
  a first beam emitting subsystem configured to generate a first plurality of coherent beams, and
  a first optical assembly configured to direct the first plurality of coherent beams towards a target, and collect radiation reflected from the target;
a second transceiver comprising:
  a second beam emitting subsystem configured to generate a second plurality of coherent beams,
  a detector to receive radiation, and
  a second optical assembly having an aperture and configured to:
    direct the second plurality of coherent beams through the aperture towards the target,
    collect, via the aperture, radiation reflected from the target, the collected reflected radiation including at least a first component of radiation corresponding to the first plurality of coherent beams and a second component of radiation corresponding to the second plurality of coherent beams impinging on the target, and
    guide the first component of radiation to the detector,
  wherein the detector is configured to generate, from the first component of radiation, a signal indicative of an intensity of radiation impinging on the target corresponding to the first plurality of coherent beams; and
a control subsystem associated with the first transceiver and the second transceiver, the control subsystem configured to modify at least one parameter of the first transceiver based on the signal generated by the detector.

15. The system of claim 14, wherein the control subsystem modifies the at least one parameter of the first transceiver by actuating the first beam emitting subsystem to adjust a beam parameter of one or more coherent beams of the first plurality of coherent beams based on the signal generated by the detector.

16. The system of claim 14, wherein the control subsystem modifies the at least one parameter of the first transceiver by modifying a parameter of the first optical assembly based on the signal generated by the detector.

* * * * *